United States Patent [19]

Marzocchi et al.

[11] 4,278,470

[45] Jul. 14, 1981

[54] BITUMINOUS COMPOSITE REINFORCED WITH A FILLER COATED WITH THE REACTION PRODUCT OF BITUMEN AND AN ORGANOSILICON COMPOUND

[75] Inventors: Alfred Marzocchi; Michael C. Roberts; Charles E. Bolen, all of Newark, Ohio

[73] Assignee: Owens-Corning Fiberglas Corporation, Toledo, Ohio

[21] Appl. No.: 135,802

[22] Filed: Mar. 31, 1980

Related U.S. Application Data

[60] Division of Ser. No. 43,065, May 29, 1979, which is a continuation-in-part of Ser. No. 970,774, Dec. 18, 1978, abandoned, which is a continuation of Ser. No. 852,778, Nov. 18, 1977, abandoned.

[51] Int. Cl.³ .................... B32B 11/00; C08L 95/00
[52] U.S. Cl. ................ 106/281 R; 106/282; 428/378; 428/397; 428/403; 428/406; 428/447; 428/489
[58] Field of Search .............. 428/489, 378, 403, 406, 428/446, 447; 106/281 R, 282, 308 Q

[56] References Cited

U.S. PATENT DOCUMENTS

| | | | |
|---|---|---|---|
| 2,771,387 | 11/1956 | Kleist et al. | 428/489 |
| 2,811,769 | 11/1957 | Craig | 428/392 X |
| 3,021,566 | 2/1962 | Sommer | 428/489 X |
| 3,372,083 | 3/1968 | Evans et al. | 428/447 X |
| 3,457,136 | 7/1969 | Zaadnoordijk | 428/480 X |
| 3,837,898 | 9/1974 | McCombs et al. | 260/29.7 H X |
| 3,861,933 | 1/1975 | Doi | 106/273 N |
| 3,931,440 | 1/1976 | Bickford et al. | 106/282 |
| 4,026,853 | 5/1977 | Dressnandt et al. | 260/28 R X |
| 4,036,661 | 7/1977 | Schmidt et al. | 106/273 N |
| 4,038,096 | 7/1977 | Graf et al. | 106/273 N |

Primary Examiner—Lorraine T. Kendell
Attorney, Agent, or Firm—Ronald C. Hudgens; Robert F. Rywalski; Keith V. Rockey

[57] ABSTRACT

Glass fibers, either in the form of individual filaments or bundles or glass fibers, which have been coated with a chemically-modified asphalt prepared by reacting a bituminous material with an organo silicon compound in which the organic group attached to the silicon atom contains a functional group reactive with the bitumen. The coated fibers can be used as reinforcement for bitumen or bitumen plus aggregate to securely tie the glass fiber surfaces to the bitumen.

3 Claims, 4 Drawing Figures

BITUMINOUS COMPOSITE REINFORCED WITH A FILLER COATED WITH THE REACTION PRODUCT OF BITUMEN AND AN ORGANOSILICON COMPOUND

This is a division of application Ser. No. 043,065, filed May 29, 1979 which is a continuation-in-part of application Ser. No. 970,774, filed Dec. 18, 1978, now abandoned, which in turn is a continuation of Ser. No. 852,778, filed Nov. 18, 1977, now abandoned.

This invention relates to asphalt reinforced materials, and more particularly to glass fibers treated with chemically-modified asphalts to promote compatibility between glass fibers and asphalt in the manufacture of glass fiber-reinforced asphalt systems.

In recent years, increasing attention has been given to the use of reinforcement of asphalt systems as provided by glass fibers. One of the problems which has been incurred in integrating glass fibers with asphalt as a reinforcement stems from the fact that glass fibers or fragments of glass have smooth, hydrophilic surface characteristics. Thus, the smooth, hydrophilic surfaces of the glass fibers make it difficult to establish any bond, either chemical or physical, between the glass fibers and the asphalt system in which the glass fibers are distributed as reinforcement. In fact, the highly hydrophilic characteristics of the glass fibers are formed, a thin film of moisture which serves to destroy any chemical or physical bond which might otherwise be formed between the glass fiber surfaces and the asphalt.

The problem of establishing a secure bonding relationship between the glass fiber surfaces and the asphalt is not aided by the chemical nature of the asphalt. Asphalt is a cementitious material containing predominantly bitumens occurring in nature or obtained as a result of the refining of petroleum. Chemically, the asphalt is made up of condensed hydrocarbon rings, and thus is highly hydrophobic in nature, thereby further causing incompatibility with the hydrophilic glass fiber surfaces.

It has been determined that the condensed hydrocarbon ring of asphalt do contain various reactive groups, notably carbon-to-carbon double bonds, carboxy groups and hydroxy groups. These groups, however, do not measurably affect the hydrophobic characteristics of asphalt systems. It has been proposed, in U.S. Pat. No. 4,036,661, to integrate asphalt with mineral aggregate by adding to the asphalt an organo silicon compound, and preferably one derived from an organo silane in which the organic group contains one or more functional groups such as an amino group, an aminoalkyleneamino group, a glycidoxy group, a hydrocarbyl group, an acyloxy group or a mercapto group. The difficulty in the approach described by the foregoing patent stems from the fact that organo silanes of the type taught therein are extremely expensive, and thus large quantities would necessarily be used in the construction of an asphalt road containing such silanes. Thus, the procedure proposed is economically unattractive.

It is accordingly an object of this invention to provide treated glass fibers for use in the reinforcement of asphalt systems to integrate the glass fibers with the asphalt in an efficient and economical manner.

It is a more specific object of the invention to provide glass fibers which have been treated with a chemically-modified asphalt so that organo silicon compounds are chemically reacted with the asphalt in such a manner as to establish a chemical bond between the chemically-modified asphalt and the glass fiber surfaces.

These and other objects and advantages of the invention will appear more fully hereinafter, and, for purposes of illustration and not of limitation, an embodiment of the invention is shown in the accompanying drawings wherein.

Figure 1:
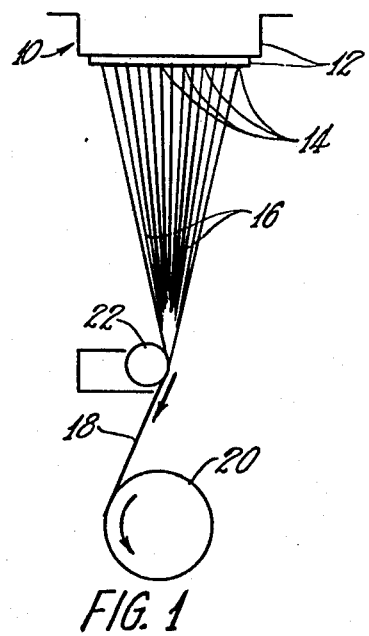
FIG. 1 is a flow diagram showing the manufacture of continuous glass fibers and their treatment in forming according to the practice of this invention.

The concepts of this invention reside in the treatment of glass fibers with a chemically-modified bitumen composition to form a coating on the glass fibers, either a thin film coating on the individual glass fiber filaments and/or a coating in the form of an impregnant of bundles of glass fibers. The coating of the chemically-modified bitumen is formed of a bitumen which has been reacted with an organo silicon compound, and preferably an organo silane containing at least one organic group bonded directly to the silicon atom, with the organic group containing a functional group reactive with the asphalt, and at least one readily hydrolyzable group, with any remaining valences on the silicon atom being occupied by hydrogen.

Without limiting the present invention as to theory, it is believed that the functional group of the organic group contained by the organo silane becomes chemically bonded to the bitumen, thereby leaving the readily hydrolyzable group of the organo silane free to react with the highly hydrophilic surfaces of the individual glass fiber filaments to thereby chemically intertie the chemically-modified bitumen to the glass fiber surfaces. This effect can be illustrated by reference to an organo silane containing an amino alkyl group bonded directly to the silicon atom. The resulting amino silane is first reacted with the asphalt to form, for example, an amide bond between carboxy groups contained in the asphalt and the amino group of the silane according to the following:

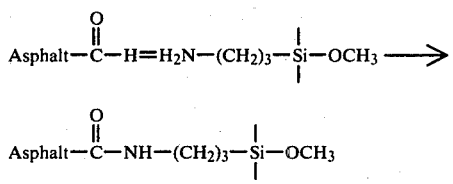

The chemically-modified asphalt containing a hydrolyzable group (the methoxy group bonded directly to the silicon atom) can thereafter be reacted with highly hydrophilic glass fiber surfaces to form a siloxane bond between the glass and the chemically-modified asphalt according to the following:

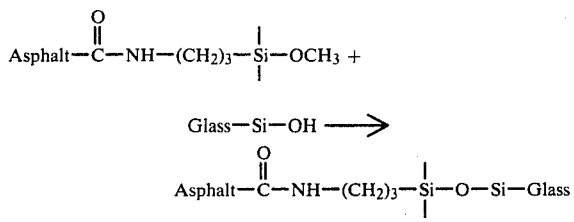

Thus, the asphalt can thereby be chemically bonded to the glass fiber surfaces and securely intertie the asphalt thereto.

It has been found that glass fibers treated in that manner can thereafter be employed as reinforcement for bitumens such as asphalt in a variety of applications, including road paving applications, roofing applications and the like. Thus, it is necessary to use only sufficient quantities of the expensive organo silanes to chemically modify the bitumens applied as a coating to the glass fibers. The bitumen coating on the glass fibers, in turn, can be securely integrated with bitumens or bitumens and aggregate whereby the chemically-modified bitumen coating on the glass fibers serve to securely intertie the glass fiber surfaces to the bitumen in which the glass fibers are distributed.

The concepts of this invention are not limited to use with glass fibers. In general, the concepts of this invention can be used in the treatment of natural or synthetic, hydrophilic fillers and/or reinforcements in which the filler and/or reinforcement is present in the form of discrete particles. Included are fibers formed of such natural and synthetics such as polyvinyl alcohol, cellulose, as well as filler materials such as glass flake.

The use of the concepts of the present invention with glass flake represents a particularly desirable embodiment of the invention. Thus, glass flake, discrete glass platelets can be admixed with the chemically-modified bitumens such as the chemically-modified asphalt in accordance with the concepts of this invention and then used in road paving and roofing applications. The glass flake tends to migrate within the asphalt to form a barrier layer of overlapping glass platelets, which in turn serves as a moisture-impervious membrane. This concept can be particularly advantageous when applied to road paving applications since the glass flake membrane serves to prevent moisture from permeating the asphalt road bed. The result is that there is less moisture under the surface of the asphalt to cause damage to the asphalt road bed through freezing.

As the organo silane, use is preferably made of a silane having the general formula:

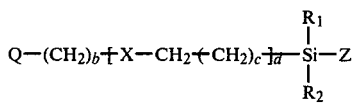

wherein Q is a functional group selected from the group consisting of an amino group, a hydroxy group, a halogen atom, an epoxy group and a mercapto group; b is an integer ranging from 2 to 6; X is O or NH; c is an integer from 1 to 6; d is 0 or an integer from 1 to 5; Z is a readily hydrolyzable group, and preferably halogen (i.e., chlorine or bromine) or a $C_1$ to $C_4$ alkoxy group (e.g., methoxy, ethoxy, propoxy, etc.); $R_1$ and $R_2$ are each non-hydrolyzable organic groups or a readily hydrolyzable group as defined above. Where $R_1$ and/or $R_2$ is an organic group, it can be any of a number of such groups including $C_1$ to $C_5$ alkyl, $C_2$ to $C_5$ alkenyl, $C_4$ to $C_7$ cycloalkyl or a $C_1$ to $C_5$ alkyl group which has been substituted with a functional group such as a chloro group, a hydroxy group, a mercapto group, an epoxy group, an epoxy ether group, an amino group or the like. Illustrative of suitable silanes of this type include:
gamma-aminopropyltriethoxysilane,
gamma-aminopropylmethyldiethoxysilane,
bis-gamma-aminopropyldiethoxysilane,
gamma-hydroxypropyltriethoxysilane,
delta-chlorobutyldimethoxysilane,
gamma-glycidoxypropyltrimethoxysilane,
gamma-mercaptopropyltrimethoxysilane
as well as numerous others known to those skilled in the art. Also included are polyaminosilanes such as Z-6020 marketed by Dow Corning. That silane has the structural formula:

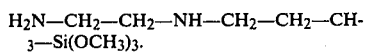

The reaction between chemically-modified asphalt and the functional silanes as described above is preferably carried out by dispersing the asphalt in an aromatic solvent inert under the reaction conditions (i.e., benzene, toluene, xylene, etc.) and then adding the silane either with or without a catalyst to promote the reaction. Catalysts useful are conventional acid and basic catalysts known to promote like esterification reactions and the formation of amides. Best results are usually achieved when the reaction is carried out at a temperature ranging from 70° to 200° C.; proportions between the silane and the asphalt are the same as those described above. In addition to the use of silanes as such, it is also possible to use the corresponding hydrolysis products thereof (i.e., the corresponding silanols and polysiloxanes).

As indicated, the chemically-modified asphalt composition can be applied as a coating to the individual glass fiber filaments, preferably as they are formed. Referring now to FIG. 1, there is shown a schematic flow diagram illustrating the treatment of glass fibers in accordance with one embodiment of the invention. As shown in this figure, glass is melted in a furnace 10 having a bushing 12 on its bottom side. The bushing is provided with a plurality of openings extending therethrough, and the molten glass flows gravitationally through the small openings to form streams 14 which are rapidly attenuated to form fine glass filaments 16 by winding the filaments about a rapidly rotating drum 20.

The filaments 16 may be coated as they are formed with the chemically-modified asphalt composition, preferably dissolved in a solvent, as they are gathered to form a strand 18. For this purpose, use can be made of an applicator 22, illustrated as a wiping pad constantly wet with the chemically-modified asphalt treating composition.

Figure 3:
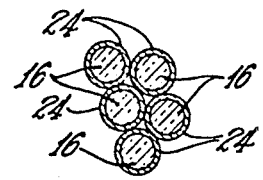
FIG. 3 is a cross sectional view of glass fibers treated in accordance with the flow diagram of FIG. 1; and, FIG. 4 is a cross sectional view of a bundle of glass fibers treated in accordance with the flow diagram of FIG. 2.

The resulting strand is shown in FIG. 3 of the drawing, where it is illustrated that the individual glass fiber filaments 16 contain the chemically-modified asphalt composition as a thin film coating 24 on the individual surfaces of the glass fiber filaments. The coated glass fibers can be used directly as reinforcement for asphalt or asphalt plus aggregate in accordance with a known manner. The coated glass fibers are thus distributed as reinforcement in asphalt alone or asphalt blended with aggregate. The asphalt or asphalt plus aggregate thus serves as a continuous phase within which the glass fibers coated with the chemically-modified asphalt are distributed. The amount of the chemically-modified asphalt applied as a coating can vary within wide limits. Generally, the coating is applied to the individual glass fiber surfaces in an amount sufficient to constitute from 0.1 to 40% by weight of the weight of the glass fibers.

Alternatively, the glass fibers can be formed into yarns, strands, cords, woven and non-woven fabrics, etc., known in the art as bundles, and then subjected to impregnation. For this purpose, use can be made of untreated glass fibers or glass fibers which have been sized with any of a variety of well-known size compositions. As is well known to those skilled in the art, it is frequently the practice, in the processing of glass fibers in the form of bundles, to employ glass fibers which have been sized whereby the size composition imparts lubricity of the individual glass fiber filaments without destroying their fibrous characteristics. In that manner, the glass fibers can be processed in bundle form without risk of destruction of the glass fibers through mutual abrasion.

Figure 2:
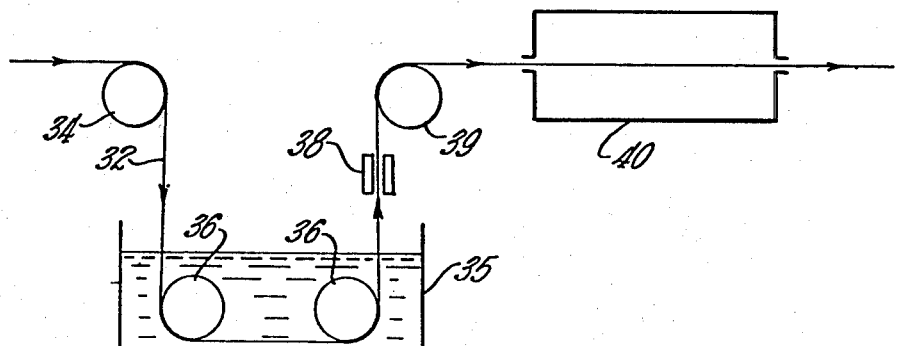
FIG. 2 is a flow diagram illustrating the treatment of glass fibers in the form of bundles according to the practice of this invention.

In accordance with this embodiment of the invention, a glass fiber bundle is impregnated with the chemically-modified asphalt composition whereby the impregnant serves to coat the individual glass fiber filaments and to completely fill the interstices between the glass fiber filaments forming the bundle and thereby define a unitary bundle structure. Apparatus for that purpose is illustrated in FIG. 2 of the drawings wherein the glass fiber bundle is advanced over a guide roller 34 for passage downwardly into a bath 35 containing the chemically-modified asphalt composition. Once in the bath, the bundle is turned under a pair of rollers 36 to effect a sharp bend in the bundle which operates to open the bundle and to facilitate more complete penetration of the chemically-modified asphalt composition into the bundle.

The impregnated bundle is then raised from the bath 35 for passage through a roller or die 38, operating to remove excess impregnating composition from the bundle. Thereafter, the bundle is advanced over a roller 39 into a drying oven 40 to set the chemically-modified asphalt composition in situ in the glass fiber bundle.

Figure 4:
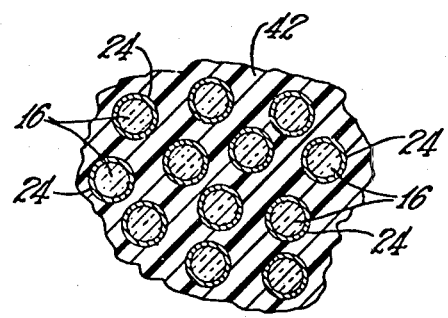

The resulting bundle is shown in FIG. 4 of the drawing, and comprises a plurality of glass fibers 16 having the optional thin size coating 34 on the surfaces thereof and the impregnant 42 in the bundle. As can be seen from this figure, the impregnant 42 substantially completely fills the interstices between the glass fibers and serves to separate the individual glass fibers each from the other. The resulting bundle can then be used in reinforcement of asphalt or asphalt plus aggregate as described above whereby the bundles of glass fibers which have been impregnated with the chemically-modified asphalt composition are distributed through the asphalt or asphalt plus aggregate as reinforcement in the continuous phase defined by the latter.

When the chemically-modified asphalt is applied as an impregnant in accordance with this embodiment of the invention, the amount of the chemically-modified asphalt applied as an impregnant can vary within relatively wide limits. Generally, the chemically-modified asphalt impregnant constitutes from 10 to about 60% by weight based on the weight of the glass fiber bundles. As will be appreciated by those skilled in the art, it is also possible to treat the glass fibers twice, first by applying a thin film coating 16 containing the chemically-modified asphalt and then subject bundles of the thus coated fibers to impregnation whereby the chemically-modified asphalt serves as a size and as an impregnant.

When the concepts of this invention are applied to the use of glass flake, the asphalt, either in a molten or emulsified form, can be blended with the glass flake, and then the resulting composite applied to a, for example, road bed to form a wear layer. The platelets forming the glass flake tend to float in the fluid asphalt so as to form an overlapping, moisture-impervious layer just beneath the surface. It is that layer which thus forms a barrier against moisture.

The amount of the glass flake employed is not critical and can be varied within relatively wide limits. It is generally preferred that the amount of glass flake employed be such that it forms at least a single layer of glass flake particles overlapping the adjacent portion to form a moisture-impervious barrier. Best results are usually obtained when the glass flake ranges from 0.001 to 10% by weight based upon the weight of the glass flake with which the asphalt is combined.

Having described the basic concepts of the present invention, reference is now made to the following examples, which are provided by way of illustration and not by way of limitation, of the practice of this invention in the preparation of asphalt compositions chemically modified with organo silicon compounds and their use in the reinforcement of asphalt systems.

EXAMPLE 1

This example illustrates the preparation of an organo silane modified asphalt composition useful in the practice of this invention.

A solution of 200 parts by weight of a paving grade asphalt (50/60 penetration at 77° F.) is dissolved in 50 parts by weight of toluene and placed in a stirred flask equipped with a heater. Thereafter, 1.2 parts by weight of gamma-aminopropyltriethoxysilane are added to the solution.

The solution is then heated to reflux for 3 hours. At the end of that time, the heating is discontinued and the toluene solvent removed.

The chemically-modified asphalt is then applied as a thin film coating to glass fibers using the procedure illustrated in FIG. 1 of the drawing. The chemically-modified asphalt, dissolved in toluene is applied to constitute a coating of about 0.61% by weight based on the weight of the glass fibers. It is then combined with asphalt and aggregate as reinforcement. The treated glass fibers are found to have good adhesion to the asphalt constituting the continuous phase in which the glass fibers are distributed as reinforcement.

In carrying out the reaction between the organo silicon compound as described above and the asphalt to produce a chemically-modified asphalt, use can be made of varying amounts of the organo silicon compound. In general, best results are usually achieved when the organo silicon compound is present in an amount ranging from 0.001 to about 5% by weight, and preferably 0.005 to about 1% by weight, based on the weight of the asphalt.

EXAMPLE 2

Using the procedure described in Example 1, delta-mercaptobutyltriethoxysilane is treated with asphalt in the presence of a solvent. The chemically-modified asphalt is thereafter applied as a thin film coating to individual glass fiber filaments using the procedure described in FIG. 1.

It is found that good adhesion between the treated glass fibers and asphalt is achieved.

EXAMPLE 3

Using the procedure described in Example 1, the paving grade asphalt described in Example 1 is reacted with 1% by weight of gamma-hydroxypropylethyldimethoxysilane.

The resulting chemically-modified asphalt composition is then employed as a hot melt to impregnate bundles of glass fibers which have been sized with a glass fiber size composition of the type described in U.S. Pat. No. 3,837,989, the disclosure of which is incorporated herein by reference. The impregnant of the modified asphalt is applied in an amount to constitute about 13.1% by weight based on the weight of the glass fiber bundle.

The impregnated bundles are then combined with asphalt and aggregate whereby the impregnated bundles are distributed through the asphalt and aggregate as a continuous phase, the bundle serving as an impregnant therefor. Good adhesion between the impregnated bundles of glass fibers and the asphalt is achieved.

EXAMPLE 4

Using the procedure described in Example 1, asphalt is reacted with 0.9% by weight of gamma-glycidoxypropyltrimethoxysilane. The resulting chemically-modified asphalt composition can be applied to glass fibers as a thin film coating described in Example 1 or as an impregnant as described in Example 3. In either case, the resulting coated glass fibers are characterized by good adhesion to asphalt or asphalt plus a filler aggregate material.

It will be understood that various changes and modifications can be made in the details of procedure, formulation and use, without departing from the spirit of the invention, especially as defined in the following claims.

We claim:

1. A reinforced composite comprising a bitumen as a continuous phase and, as reinforcement in the bitumen, a filler selected from the group consisting of natural and synthetic fillers having a coating thereon, said coating comprising the reaction product of bitumen and an organo silicon compound containing at least one organic group bonded to the silicon atom, with the organic group being substituted with a functional group reactive with the bitumen, and at least one readily hydrolyzable group.

2. A composite as defined in claim 1 wherein said fillers are hydrophilic fillers.

3. A composite as defined in claim 1 wherein the filler is in the form of fibers.

* * * * *